(12) United States Patent
Shahid

(10) Patent No.: US 6,474,877 B1
(45) Date of Patent: Nov. 5, 2002

(54) ALIGNMENT ASSEMBLY FOR MULTI-OPTICAL FIBER FERRULES

(75) Inventor: Muhammed A. Shahid, Snellville, GA (US)

(73) Assignee: Fitel USA Corporation, Norcross, GA (US)

( * ) Notice: Subject to any disclaimer, the term of this patent is extended or adjusted under 35 U.S.C. 154(b) by 0 days.

(21) Appl. No.: 09/833,321

(22) Filed: Apr. 12, 2001

(51) Int. Cl.[7] .................................................. G02B 6/38
(52) U.S. Cl. ........................................................ 385/65
(58) Field of Search ............................ 385/65, 147, 63, 385/71

(56) References Cited

U.S. PATENT DOCUMENTS

| | | | |
|---|---|---|---|
| 4,973,127 A | 11/1990 | Cannon, Jr. et al. | 385/56 |
| 5,603,870 A | * 2/1997 | Roll et al. | 156/92 |
| 5,620,634 A | 4/1997 | Shahid | 264/102 |
| 6,045,270 A | * 4/2000 | Weiss et al. | 385/59 |
| 6,259,856 B1 | 7/2001 | Shahid | 385/147 |

OTHER PUBLICATIONS

Shahid, et al., "Small and Efficient Connector System", 49th ECTC Conference, San Diego, California, 1999, pp. 1–6.
U.S. Utility Patent Appl. Ser. No. 09/262,112 to Shahid, entitled "STackable Multi–Fiber Ferrule Assembly Method and Tools".

* cited by examiner

Primary Examiner—Tulsidas Patel
(74) Attorney, Agent, or Firm—Thomas, Kayden Horstemeyer & Risley, LLP

(57) ABSTRACT

A support member for forming connector ferrules by stacking two or more support members together has first and second longitudinally extending truncated V-grooves extending from the face of the support member. The rear portion has at least one stop member extending transversally from the wall of the groove and defining a restricted passageway in the V-groove. An alignment pin having a cylindrical shape has a reduced diameter groove near the rear portion thereof which has a diameter slightly less than the transverse dimensions of the restricted passageway and forming front and rear shoulders, spaced a distance slightly greater than the length of the stop members. The rear portion of the pin has a pair of diametrically opposed flats whose transverse spacing approximates the diameter of the reduced diameter groove.

18 Claims, 4 Drawing Sheets

US 6,474,877 B1

ALIGNMENT ASSEMBLY FOR MULTI-OPTICAL FIBER FERRULES

RELATED APPLICATION

The subject matter of the present invention is related to the subject matter of U.S. patent application Ser. No. 09/262,112 filed Mar. 4, 1999 of Shahid (Shahid 39) and patent application Ser. No. 09/276,285 filed Mar. 25, 1999 of Shahid (Shahid 41), the disclosures of both of which are incorporated by reference herein.

FIELD OF THE INVENTION

This invention relates to optical fiber connectors and, more particularly, to an alignment assembly for precision connection of connector ferrules.

BACKGROUND OF THE INVENTION

Communication by means of optical signals transmitted over optical fibers has become extremely popular and has given rise to a unique and rapidly growing technology. In particular, optical technology is being used more and more in broadband systems where communication is by means of high speed optical channels. The need for efficient utilization of available real estate on circuit boards, racks and shelves, back planes, and distribution channels, etc. is becoming increasingly important as miniaturization proceeds apace, wherein generating, transporting, managing, and delivering broadband service is performed in or by smaller and smaller components. As a consequence, the industry has placed an emphasis on small form factor optical connectors, such as the LC connector from Lucent Technologies Inc. However, miniaturization is tempered by the requirements of transmission efficiency. For instance, with the advent of new standards such as Gigabit Ethernet, wherein the transmission efficiency is becoming more and more critical, the performance of optical connectors is becoming correspondingly important for healthy operation of networks and systems. Thus, it is desirable to obtain component miniaturization without sacrificing transmission efficiency, and preferably while improving transmission efficiency.

With the miniaturization of optical modules and optical fiber devices, the management of optical fiber congestion has become an issue at optical interfaces and connection distribution points. One solution is the use of multi-fiber ribbon in which a plurality of optical fibers are organized and molded side by side in a plastic ribbon. It is known to interconnect these ribbon cables by supporting the fibers between two support members preferably but not necessarily made of a monocrystalline material, such as silicon. In the support members are V-grooves formed utilizing photolithographic masking and etching techniques. The fibers are placed side by side in individual V-grooves of one support member and the other mating support member having corresponding V-grooves is placed over the fibers so as to bind or hold the fibers in a high precision, spatial relationship between the mating V-grooves. The top and bottom support members sandwiching the multi-fiber ribbon are typically bonded together with a clamp or adhesive, forming a ferrule of a multi-fiber connector. Two mating ferrules with the same fiber spacing may then be placed in an abutting relationship so that the ends of the fibers of the respective ferrules are substantially co-axially aligned with one another, thereby forming a multi-fiber connection. If desired, such ferrules can be stacked in order to increase the interconnection density.

Multi-fiber ribbons and connectors have numerous applications in optic communication systems. For instance, some opto-electronic and optical application specific integrated circuits (OASIC) devices, e.g., optical switches, optical power splitters/combiners, routers, etc. have several input and/or output ports arranged as linear arrays to which a plurality of fibers are to be coupled. Further, since optical fibers are attached to launch optical signals into these devices and extract optical signals out of these devices, splicing of arrays of fibers (i.e., a multi-fiber ribbon) to such devices can be achieved using multifiber connectors. Yet another possible application relates to an optical fan-out fabric where an array of fibers in a multi-fiber ribbon may be broken into simplex or duplex channels for distribution purposes, as is often desired.

A critical factor to the optical efficiency of a multi-fiber connector, whether or not stacked, is the precise alignment of the mating ferrules with regard to one another. As the ferrule structures utilized to achieve the precise axial alignment of corresponding optical fibers of a multi-fiber connection become smaller, there exists a need for connectors that are likewise space efficient so that full advantage of the miniaturized ferrule can be realized with higher interconnection density. Further, there also exists the need for multi-fiber connectors to be user friendly so that the operation and utility of the multi-fiber connector is intuitive to the workers that will be installing systems utilizing optical components. For example, it is desirable for multi-fiber connectors to have plug-and-play capability, in that they can be quickly and easily coupled to a piece of equipment, device, or one another. It is common practice in the art today to provide first and second large V-grooves on either side of the array of V-grooves in which the fibers are contained, and parallel thereto. The enlarged V-grooves have mounted and affixed therein, as by cementing, alignment pins which project out of the front face of the ferrule. When a connection is to be made with another ferrule, this other ferrule has the enlarged V-grooves but no alignment pins, so that the alignment pins can fit therein in a male-female connection, to align the two ferrules precisely and, hence, the fibers contained therein. Such a connection is quickly and easily accomplished, thereby fulfilling the user friendly desideratum.

Because of the high frequencies involved as well as the large bandwidths of the signals being transmitted at high speed through the connection, it is essential for optimum alignment of the fibers that the faces of the ferrules be highly polished to a high degree of flatness, and that they be clean or free of even minute accumulations of dirt or dust. To this end, it is desirable that cleaning the ferrules and, more particularly, their front or butting faces, be done from time to time to insure optimum cleanliness. However, because of the alignment pins projecting from the front face, the cleaning and polishing of the ferrule faces is extremely difficult to accomplish both from the standpoint of a complete cleaning and polishing and from the necessity of protecting the alignment pins from damage.

SUMMARY OF THE INVENTION

The present invention is directed to making the cleaning, polishing, or re-finishing of a ferrule face from which the alignment pin or pins project an easily performed operation.

In accordance with the principles of the invention, each of the enlarged V-grooves in the support member for containing a locating pin extends from the front face of the ferrule support member toward the rear, parallel to the V-grooves for containing the fibers. A rear portion of the enlarged groove has first and second stop member projecting from opposite walls of the groove forming a restricted space therein forming a chamber which extends to the rear. Each chamber has a bore connecting it to the exterior which is designated as an exhaust port. Thus when, for example, it is desired, after the support members are assembled into a sandwich, as discussed hereinbefore, to clean the enlarged V-grooves, compressed air, for example, may be blown into the passage formed by the enlarged V-grooves, and any dirt or debris is exhausted out of the exhaust ports.

Alignment or guide pins for mounting in the enlarged V-grooves are made of suitable hard, durable material, preferably, but not limited to, necessarily, stainless steel, and each comprises an elongated cylindrical member or rod having a chamfered front end for ease of insertion into the enlarged V-groove of the mating ferrule. The alignment pins may also be made of ceramic material. The rear portion of the rod has a reduced diameter groove wherein the diameter is only slightly less than the lateral spacing of the stop members. Between the chamfered rear end of the rod and the reduced diameter groove is a pair of diametrically opposed flats, the distance between which is slightly less than the lateral spacing of the stop members, being substantially equal to the diameter of the groove. As will be seen hereinafter, the groove has front and rear shoulders spaced apart a distance slightly greater than the length of the stop members. These shoulders prevent the alignment pin from moving axially, thereby functioning to hold the pin in place within its groove. However, the flats eliminate the rear shoulder so that if the pin is rotated to a position where the flats are vertically oriented, the stop members no longer function to prevent axial movement of the pin, and it may be introduced into or withdrawn from the ferrule. With the pin withdrawn and separated from the ferrule, the front face may easily be cleaned and polished, after which the pin (or pins) is reinserted into its V-groove opening in the ferrule, rotated so that the flats are vertical so that the rear portion may be moved into the chamber, and then rotated ninety degrees, for example, so that the front and rear shoulders of the groove embrace the stop members to prevent axial movement of the pin. The process is simply reversed to remove the pin. Thus, the alignment pin need not be cemented in place and can be removed and replaced as needed.

Various principles and features of the present invention will be more readily apparent from the following detailed description, read in conjunction with the accompanying drawings.

DETAILED DESCRIPTION

The present invention comprises a connector ferrule and alignment pin for use in small form factor, multi-fiber connectors for use, in turn, in high density interconnection systems and, because of its unique structure, greatly simplifies the cleaning and polishing of the ferrule, which is a necessity for optimum operation of the connector.

Figure 1:
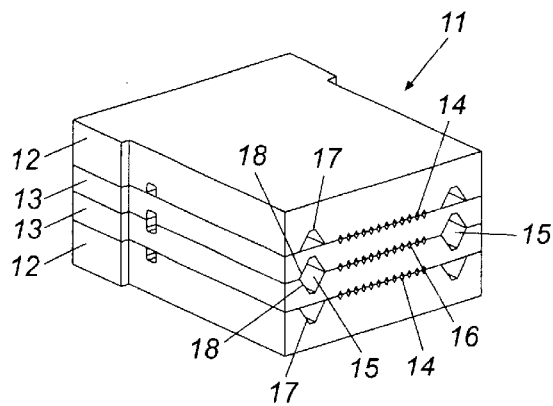
FIG. 1 depicts a ferrule having a particular arrangement of stackable support members.

In FIG. 1 there is shown a stackable ferrule 11 which comprises two outer support members 12 which sandwich substantially identical inner support members 13. The support members 12 and 13 are, as described in the aforementioned U.S. patent applications, preferably made from injection molded plastic material which is made to a high degree of precision with a plurality of V-grooves 14 and 16 for holding individual fibers in a parallel array within the ferrule. The ferrule 11 of FIG. 1 terminates three multi-fiber ribbons, not shown. On either side of the array, each of the members 12 and 13 has an enlarged terminated V-groove 17, 18 which, when the members 12 and 13 are stacked as shown in FIG. 1, form a passage 15, parallel to the V-grooves 14 and 16, for holding alignment pins as shown in FIGS. 2 and 3.

Figure 2:
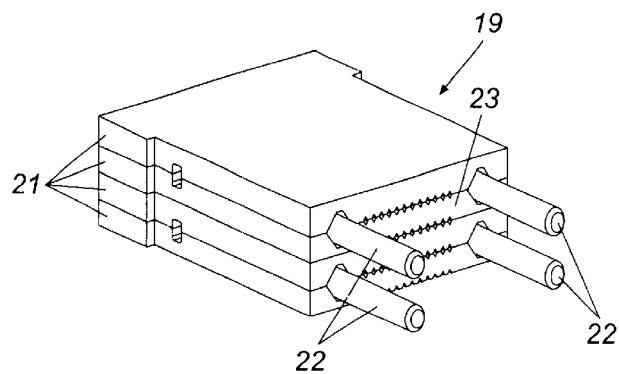
FIG. 2 depicts a second ferrule made up of stackable support members and having alignment pins.
Figure 3:
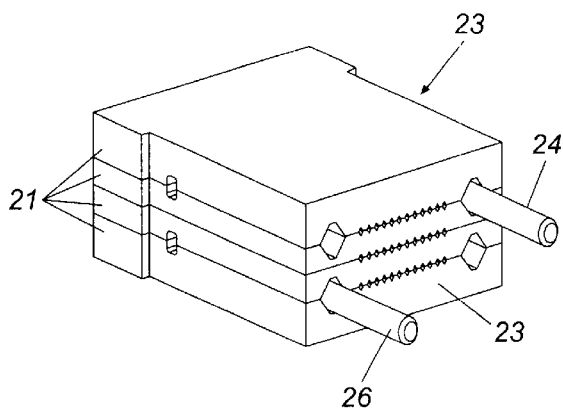
FIG. 3 depicts a third ferrule made up of stackable support members and having a polarizing arrangement of alignments.
Figure 4:
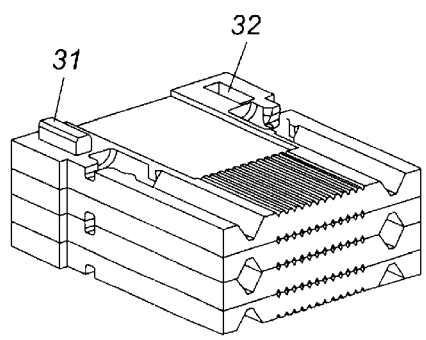
FIG. 4 depicts the manner in which the stackable support members are aligned.

FIG. 2 shows a ferrule 19 which comprises a stack of four substantially identical support members 21 having four alignment pins 22 projecting from the front face 23 of the ferrule thus formed. Ferrule 19 is, therefore, a male ferrule adapted to mate with a substantially identical female ferrule having the alignment pin passages, but no alignment pins. The male-female relationship of the ferrules is commonly used, however it necessitates that a technician or installer carry both types. In FIG. 3 there is shown a ferrule 23 which substantially the same as that shown in FIG. 2 except that it only has two alignment pins 24 and 26 oriented on a diagonal on the face 23 of the ferrule. It can be appreciated that when the two identical ferrules to be joined face each other, the pins 24 and 26 in each ferrule are directly opposite to, and received by, empty passages in the other ferrule. Thus, connection of the two ferrules can be made with only one orientation, and the ferrules are said to be polarized. The stacking of the support members must be done with precision so that each V-groove in each support member is directly opposite the corresponding V-groove in the contiguous support member. To this end and as shown in FIG. 4, each support members has a locating lug 31 on one side of its top (or bottom) surface, and a lug receiving hole 32 on the other side, as shown in FIG. 4.

The ferrules depicted in FIGS. 1 through 4 are examples of various ferrule configurations.

Figure 5:
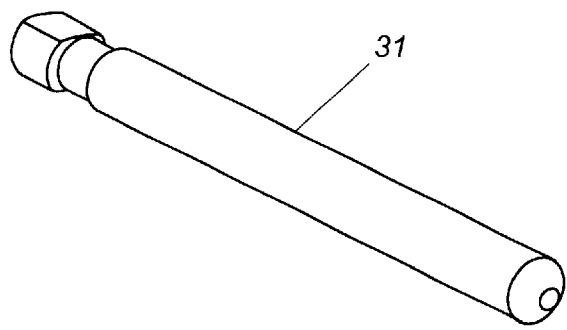
FIG. 5 is a perspective view of the alignment pin of the invention.
Figure 6:
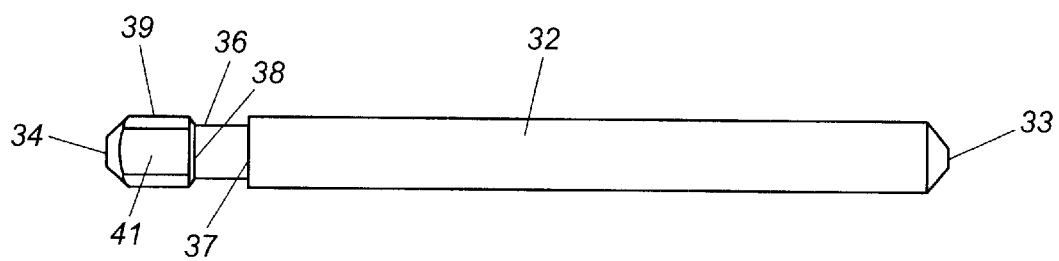
FIGS. 6 and 7 are side elevation views of the pin of FIG. 5, axially rotated 90° with respect to each other.
Figure 7:
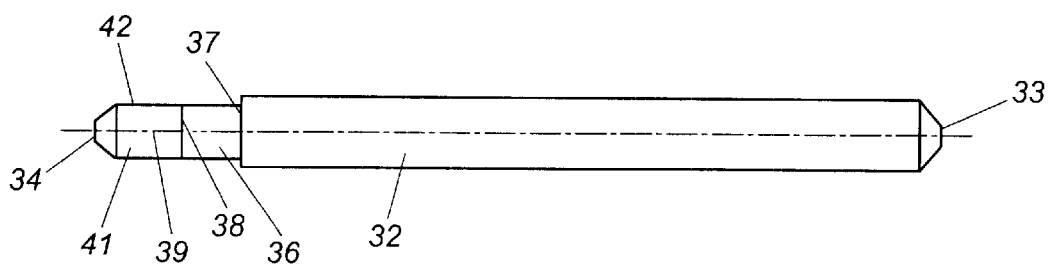
Figure 8:
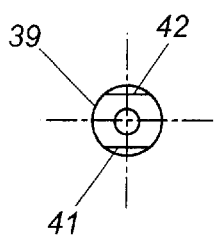
FIG. 8 is a rear elevation view of the alignment pin of the invention.

FIG. 5 is a perspective view of an alignment pin 31 embodying the principles of the present invention, and FIGS. 6, 7, and 8 are detailed views thereof. As shown in these figures, pin 31 comprises a solid cylindrical body 32 having a front end 33 which protrudes from the front face of a ferrule and a rear end 34. Body 32 is preferably made of a suitable metal, such as stainless steel, although other materials having the necessary hardness, stiffness, and durability might readily be used such as ceramic. As shown in the figures, end 33 has a chamfer thereon to facilitate insertion in the alignment passage of a mating ferrules, and end 34 likewise is chamfered. In a region adjacent the rear end 34, body 32 has a cylindrical groove 36 which forms a front shoulder 37 and a rear shoulder 38. Body 32 extends for a short distance from rear shoulder 38 to end 34, thereby defining a rear portion 39 which has diametrically opposed flats 41 and 42 formed thereon. It can be seen that the spacing between the flats 41 and 42 is substantially equal to the diameter of groove 36, thereby eliminating two segments of shoulder 38. While two flats are shown, a single flat might be used provided it meets the criteria set forth hereinafter.

Figure 9:
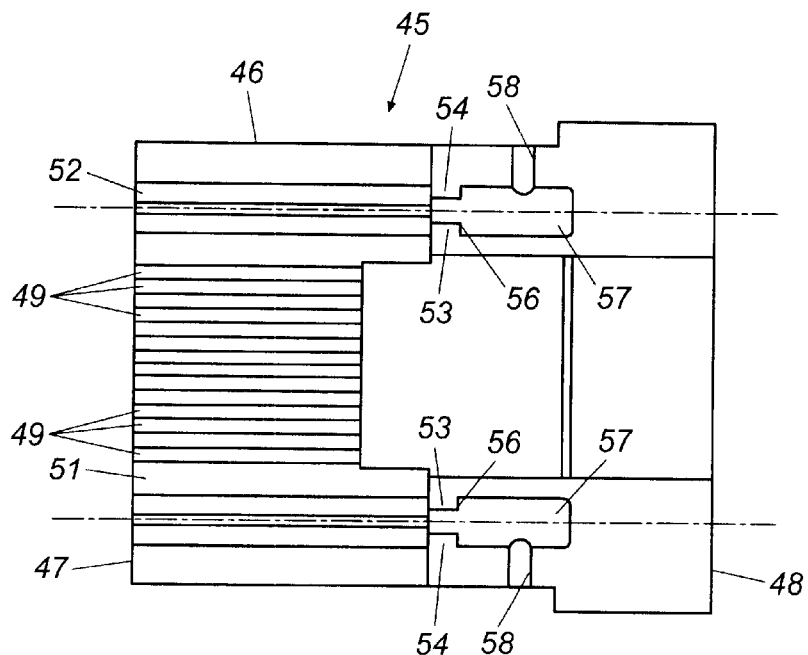
FIG. 9 is a plan view of a support member with which the pin of the invention is used.

In FIG. 9 there is shown a stackable support member 45 which is configured to receive the alignment pin or pins 31 shown in FIGS. 5 through 8. Support member 45 comprises a body 46 having a front end or front face 47 and a rear end 48. Extending from front face 47 toward the rear is a plurality of V-grooves 49 arrayed in parallel for receiving and holding a corresponding plurality of optical fibers, not shown. On opposite sides of the array of grooves 49 is an enlarged truncated V-groove 51, 52 extending parallel to the grooves 49 toward the rear of member 45. At the inner or rear end portion of each of grooves 51, 52 is a pair of protruding stop members 53, 54 spaced from each other as shown and forming a restricted passageway. Extending from the rear 56 of the stop members is a chamber 57 which communicates with the exterior of member 45 by means of a bore 58. As pointed out in the foregoing, bores 58 function as exhaust passages for chambers 57 during a cleaning operation, as with compressed air, when the support members are arranged in a stack. Although two stop members are shown, one stop member may possibly be used provided it meets the criteria set forth hereinafter.

Figure 10:
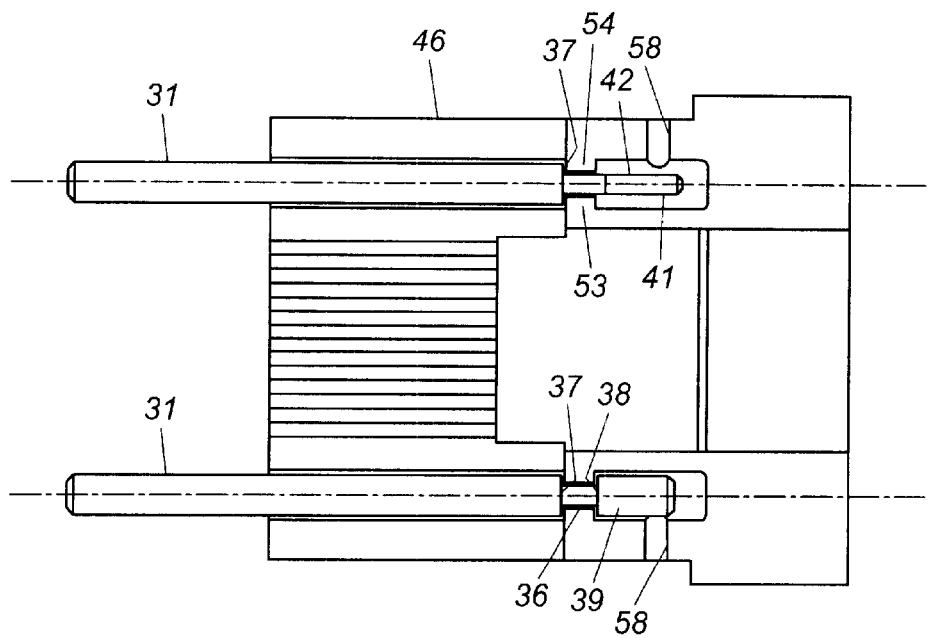
FIG. 10 depicts the manner of inserting an alignment pin into the support member.
Figure 11:
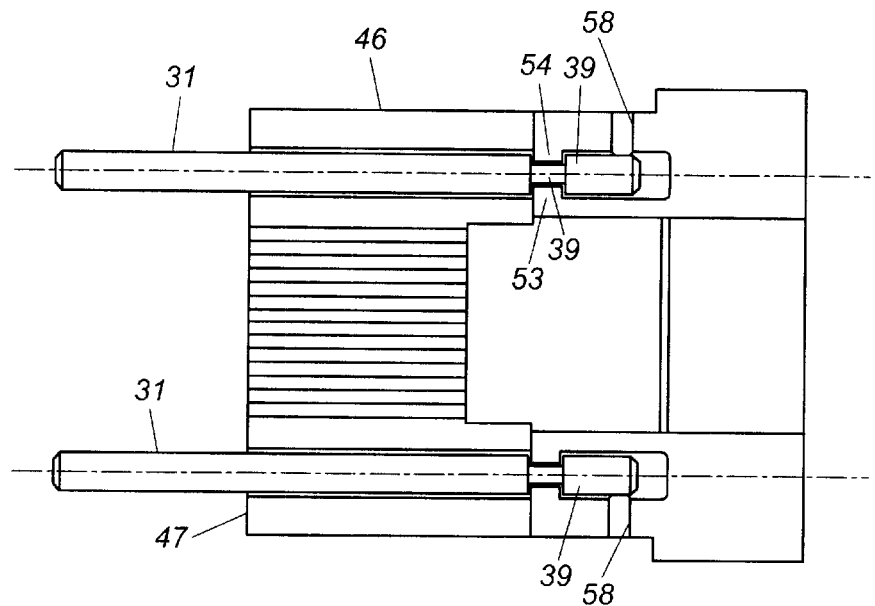
FIG. 11 depicts a support member having two alignment pins therein oriented in their operative position.

FIGS. 10 and 11 depicts the support member body 46 and demonstrates the insertion of an alignment pin 31 therein (top pin as viewed in FIG. 10) and an inserted pin 31 locked in place in support member 46 (bottom pin as viewed in FIG. 10). As can be seen in FIG. 10, the top pin 31 is rotated on its axis to where the flats 41 and 42 can pass between stops 53 and 54 until shoulder 37 on pin 31 butts against the stops. Pin 31 is then rotated approximately 90° about its axis, as shown in the bottom pin 31 and in FIG. 11 so that shoulders 37 and 38 butt against both sides of stop members 53 and 54, thereby preventing the pin 31 from being pulled out of the pin 31. The axial length of cylindrical groove 36 is preferably, although not necessarily such that both shoulders 37 and 38 bear against the front and rear surfaces of the stop members 53 and 54 so that the stop members are substantially slip fits within the groove 36, thereby tending to hold alignment pin 31 tightly. The pins 31 can be readily removed from the support member body 46 by rotating them approximately 90° on their axes to permit flats 41 and 42 pass between the stops 53 and 54 whereupon the pins may be pulled from the support member 46 to permit cleaning thereof, particularly of face 47.

Figure 12:
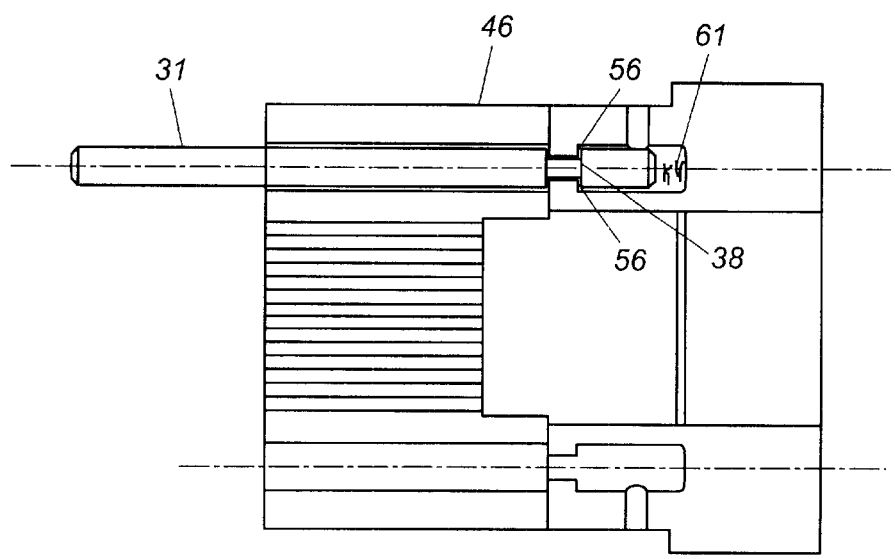
FIG. 12 depicts a modification of the ferrule of FIGS. 10 and 11.

FIG. 12 shows a modification of the arrangement of FIGS. 10 and 11 wherein a resilient member 61 is located within chamber 57 and applies an axial biasing force to pin 31 to insure that shoulder 38 bears against the rear surfaces 56 of stop members 53 and 54. Member 61 is represented as a coil spring. However, because of the very small dimensions involved, other suitable biasing means such as a leaf spring or resilient material such as rubber, for example, may better serve the purpose of applying a biasing force to the rear end 34 of pin 31.

The ferrule and alignment pin combination of the present invention, the embodiments shown, make possible the simple insertion and removal of the alignment pins, thereby greatly facilitating the cleaning, polishing, and/or renewal of the face of the ferrule. It further relieves the installer or operator of having to be equipped with separate male and female ferrules, inasmuch as either may be realized through the addition or removal of the alignment pins of the invention.

It is to be understood that the various features of the present invention might be incorporated into other types of connector arrangements, and that other modifications or adaptations might occur to workers in the art. All such variations and modifications are intended to be included herein as being within the scope of the present invention as set forth in the forgoing. Further, in the claims hereinafter, the corresponding structures, materials, acts, and equivalents of all means or step-plus-function elements are intended to include any structure, material, or acts for performing the functions in combination with other elements as specifically claimed.

What is claimed is:

1. An optical fiber connector ferrule comprising two or more support members stacked together in mating relationship;

each of said support members having a face and having first and second longitudinally extending spaced V-grooves therein extending rearwardly from said face for forming an alignment pin passageway when mated with a second support member;

a first stop member extending from the wall of at least one of said V-grooves defining a restricted passageway in said ferrule having a transverse dimension and a first length;

an alignment pin having a transverse dimension less than that of said alignment pin passageway and greater than that of said restricted passageway and having a grooved portion of a transverse dimension less than that of said restricted passageway, the length of said grooved portion being greater than that of said restricted passageway; and at least one flat portion on said pin adjacent said groove and extending to the rear thereof for creating a reduced transverse dimension of said pin less than the transverse dimension of said restricted passageway in a first rotational orientation of the pin to permit insertion of the pin into and through said restricted passageway and in a second different rotational orientation to hold the pin in place within the support member.

2. An optical fiber connector ferrule as claimed in claim 1 wherein a second stop member extends from a wall of said V-groove opposite and toward said first stop member to define said restricted passage.

3. An optical fiber connector ferrule as claimed in claim 2 wherein said grooved portion of said pin forms front and rear shoulders which are adapted to bear against said stop member.

4. An optical fiber connector ferrule as claimed in claim 1 wherein said alignment pin is cylindrical and said grooved portion has a diameter less than the diameter of said pin.

5. An optical fiber connector ferrule as claimed in claim 4 wherein said alignment pin has a rear portion extending from said grooved portion, said rear portion having said at least one flat thereon and a second flat thereon diametrically opposite said one flat, the distance between said flats being less than the transverse dimension of said restricted passage.

6. An optical fiber connector ferrule as claimed in claim 1 wherein said alignment pin passageway extends from said restricted passageway to a rear end of said passageway remote from said face, forming a chamber within said ferrule.

7. An optical fiber connector ferrule as claimed in claim 6 wherein said chamber communicates with the exterior of said ferrule through a bore in said support member.

8. An optical fiber connector ferrule as claimed in claim 7 and further including a resilient member within said chamber and adapted to bear against the end of said alignment pin.

9. An alignment pin for use in an optical fiber ferrule, said alignment pin comprising:

an elongated cylindrical member having a first end and a second end and a first diameter;

a reduced diameter groove in said cylindrical member intermediate said ends, said groove being substantially closer to said second end than said first end, the space between said reduced diameter groove and said second end constituting a rear portion of said pin; and said rear portion having a first flat surface thereon extending from said groove to said second end.

10. An alignment pin as claimed in claim 9 and further having a second flat surface on said rear portion diametrically opposite said first flat.

11. An alignment pin as claimed in claim 9 wherein said pin is made of metal.

12. An alignment pin as claimed in claim 9 wherein said pin is made of a ceramic material.

13. A stackable optical fiber support member for forming a connector ferrule, said support member comprising:

a body member having a front face and a rear portion;

said body member having an array of parallel V-grooves for containing optical fibers;

an enlarged V-groove on either side of said array and extending substantially parallel to the grooves in said array from said front face into said rear portion; and at least one stop member in said rear portion extending transversely from a first wall of said enlarged V-groove to form a restricted passageway therein having a transverse dimension less than the transverse dimension of the enlarged V-groove, said restricted passageway extending into said rear portion toward the rear of said support member.

14. A stackable fiber support member as claimed in claim 13 wherein a second stop member extends transversely from a second wall of said enlarged V-groove toward said at least one stop member and spaced therefrom.

15. A stackable fiber support member as claimed in claim 13 wherein said enlarged V-groove has a chamber formed therein extending from said restricted passageway toward the rear of said support member.

16. A stackable fiber support member as claimed in claim 15 wherein said chamber has a passageway extending therefrom to the external portion of said support member.

17. A stackable fiber support member as claimed in claim 13 and having a first surface thereon;

a locating lug extending from said surface; and a locating slot for receiving a locating lug in said surface and transversely spaced from said locating lug.

18. A stackable fiber support member as claimed in claim 13 wherein said member is made of injection molded plastic material.

* * * * *